United States Patent [19]

Matsui et al.

[11] Patent Number: 4,646,995
[45] Date of Patent: Mar. 3, 1987

[54] CORD BUSHING HAVING FALLING OFF PREVENTION FEATURE

[75] Inventors: Kazuhiro Matsui, Toyoake; Masaru Yagi, Tsushima, both of Japan

[73] Assignee: Kitagawa Industries Co., Ltd., Nagoya, Japan

[21] Appl. No.: 823,786

[22] Filed: Jan. 29, 1986

[30] Foreign Application Priority Data

Mar. 11, 1985 [JP] Japan .............................. 60-35995[U]

[51] Int. Cl.$^4$ ........................ H02G 3/18; H01R 13/58
[52] U.S. Cl. .................................. 248/56; 174/153 G
[58] Field of Search ............ 174/65 G, 152 G, 153 G, 174/135; 16/2; 248/56; 339/103 B

[56] References Cited

U.S. PATENT DOCUMENTS 3,779,494  12/1973  Nicholson et al. ......... 174/153 G X Primary Examiner—Laramie E. Askin
Attorney, Agent, or Firm—Oblon, Fisher, Spivak, McClelland & Maier

[57] ABSTRACT

A cord bushing including a body portion and a lid portion defining a passage for holding a cord and being fittable into a first aperture in an outer panel of an electrical apparatus, flanges provided at one end of the body portion and lid portion and having outer diameters greater than the first aperture, grooves formed in the body portion and the lid portion adjacent to the flanges for locking the body portion and the lid portion in the outer panel, and a falling-off preventing bar in the form of a rod extending from the flange of the body portion substantially in the same direction as the passage and adapted to be inserted into a second aperture when the body portion and lid portion are fitted into the first aperture, the falling-off preventing bar being provided with a check member which prevents the falling-off preventing bar from being extracted once it passes through the second aperture.

7 Claims, 10 Drawing Figures

CORD BUSHING HAVING FALLING OFF PREVENTION FEATURE

BACKGROUND OF THE INVENTION

1. Technical Field

The present invention relates to a cord bushing, and more specifically relates to a cord bushing having a structure which prevents the same from unintentional falling off while it is detached for the purpose of maintenance or the like.

2. Background Art

In general, when an electrical cord is laid through a case or outer panel of an electrical apparatus for electrical connection with an interior connecting terminal, a cord bushing is used to hold the cord and then to be fitted into an aperture formed in the case for protection of the cord. As the cord is securely held by the resilient cord bushing made of such as a synthetic resin, there is no fear that, when the cord is pulled, the force is directly applied to the interior connecting terminal and the cord is almost free from breakage or other troubles even when it suffers repeated bending at a fixed location.

Such a cord bushing includes a body having at one end thereof a flange which cooperates with locking means to lock the cord bushing to the case or the like, when the body is inserted into the aperture from outside of the case. As the flange covers the aperture and the locking means is hidden inside of the case, a neat finish can be obtained.

Such a cord bushing is, in normal use, securely anchored to the case or the like by the locking means, but when any trouble is found in the electrical apparatus, it is sometimes required to detach the cord bushing for maintenance. Such cases are, for example, when the cord itself is to be changed because of broken wires and when locking of the cord is to be released to remove any electronic component inside of the apparatus to which the cord is directly connected.

Such maintenance is often carried out at the location where the electrical apparatus is installed, such as the home of a general consumer or a workshop. There is a risk that the cord bushing removed for repair or maintenance can fall off and become lost. And moreover, in the field, such as at a home or workshop it is sometimes difficult to get spare cord bushings, so once the cord bushing is lost, it is supposed that maintenance can not be finished. The repairman who has lost a cord bushing may carry out assembly without the cord bushing under the necessity of temporary use of the electrical apparatus, but such an apparatus may lack safety and reliability. Therefore, it has been strongly desired to provide a device for preventing the falling off of a component which will be possibly removed during maintenance. The importance will be understood from the fact that in some countries in Europe and America provision of such a device is required.

A cord bushing including falling-off preventing means has been proposed, as disclosed in U.S. Pat. No. 3,779,494 which discloses a cord bushing employing an anchor-like locking member having its cross-sectional size substantially larger than the size of the cord bushing fitting aperture. But there is a disadvantage that such a large locking member may become an obstacle in the interior of the electrical apparatus. Other various devices have been proposed, but they cannot be said to be satisfactory for the reason such as that a cord bushing holding a cord is difficult to be removed or that the appearance of a cord bushing becomes defective.

SUMMARY OF THE INVENTION

Accordingly, it is an object of the present invention to provide a cord bushing which is marked by a completely novel ideal in comparison with the conventional cord bushings and which positively achieves prevention of falling off without spoiling facilities for attaching and detaching the cord bushing as well as the appearance thereof.

The above object is attained by means of a cord bushing comprising;

means including a body portion for defining a passage for holding therein a cord or the like and being fittable into a first aperture a in an outer panel of an electrical apparatus; flanges provided at one end of the means for defining a passage and having outer diameters greater than the first aperture a, one of the flanges forming a part of the body portion; the means for defining a passage including locking means for locking the means for defining a passage in the outer panel adjacent the flanges; and A falling-off preventing bar in the form of a rod extending from the flange forming a part of the body portion substantially in the same direction as the length of the passage and adapted to be inserted into a second aperture b when the body portion is fitted into the first aperture a, the falling-off preventing bar being provided with a check member which prevents the falling-off preventing bar from being extracted once it has passed through the second aperture b.

Preferably the cord bushing is wholly composed of a synthetic resin having resilience which functions to ensure protection of the cord and can be easily manufactured. The body portion for holding the cord may be a one-piece member having an internal clamper for clamping a cord or it may be a two-piece member including a body portion having a groove for receiving a cable and a lid portion connected to the body portion through a flexible hinge and adapted to be fitted into the body portion so as to retain the cable therebetween.

Any suitable locking means can be used such as a resilient piece provided apart from the flanges by a predetermined thickness of a panel and cooperating with the flanges so as to lock the body portion to the outer panel or case when the body portion is fitted into the aperture in the panel. The cross section of the body portion and contour of the aperture may be other than circular so as to avoid mutual rotation thereof. The falling-off preventing bar, preferably having resilience, extends from the flange, normally by a distance longer than the axial length of the body portion, and is inserted into a corresponding aperture. The falling-off preventing bar may be of any cross section such as circular or rectangular.

The check member provided in the vicinity of the free end of the falling-off preventing bar is composed of a resilient piece in the form of, for example, an arrowhead which is temporarily deflected when passing through the aperture, and after passing therethrough, it is restored to the open state due to its resilience so as to prevent backward extraction through the aperture. Other types of check members can be used such as a compressible spherical member which is to be pressed into an aperture having a diameter slightly smaller than the outer diameter of the spherical member. In this case, prevention of falling off is effected by the difference between the diameters.

In the cord bushing thus constructed, when the body portion holding therein a cord is fitted into the first aperture in the outer panel of an electrical apparatus and the falling-off preventing bar is inserted into the corresponding second aperture, the cord bushing is firmly locked to the outer panel by means of the locking means.

When the lock by the locking means is released to remove the cord bushing for maintenance or the like, the check member of the falling-off preventing bar functions to hang the falling-off preventing bar extending through the aperture in the outer panel. Thus, the cord bushing of the present invention has a structure which is effective to prevent the cord bushing from falling off of the electrical apparatus, when detached.

The present invention will become more fully apparent from the claims and description as it proceeds in connection with the drawings.

BRIEF DESCRIPTION OF THE DRAWINGS

FIG. 6 is a perspective view of the cord bushing from which the cord is removed for maintenance or the like;

DETAILED DESCRIPTION OF THE PREFERRED EMBODIMENTS

Figure 1:
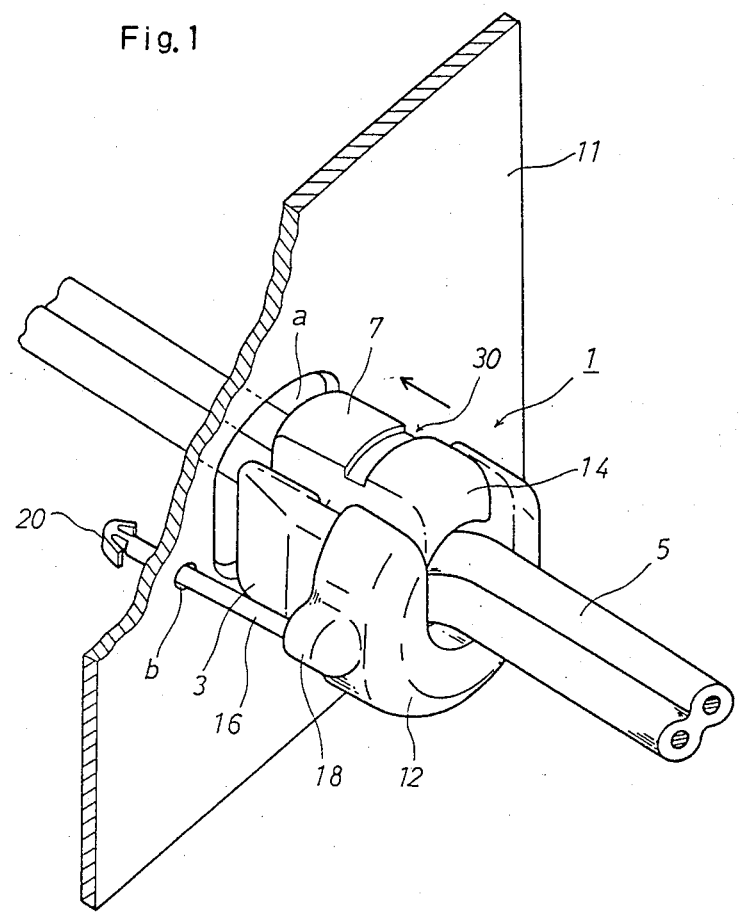
FIG. 1 is a perspective view of a cord bushing and a part of an outer panel having fitting apertures according to one embodiment of the present invention.
Figure 2:
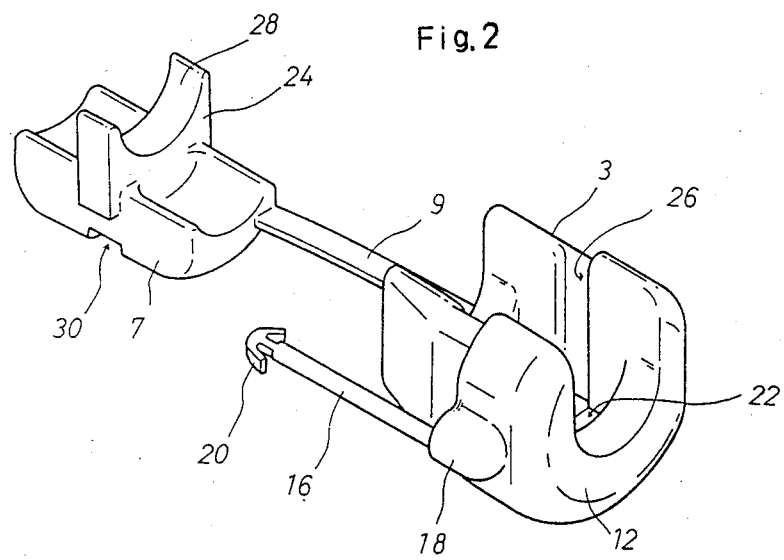
FIG. 2 is a perspective view of the cord bushing in FIG. 1 in the unfolded state.
Figure 3:
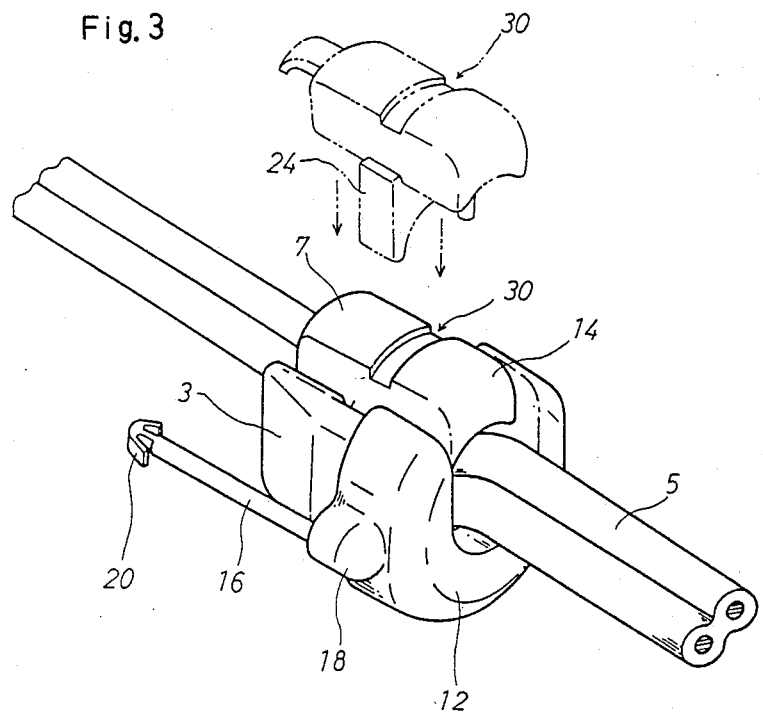
FIG. 3 is a perspective view of the cord bushing in FIG. 1 when a cord is laid thereinto.
Figure 4:
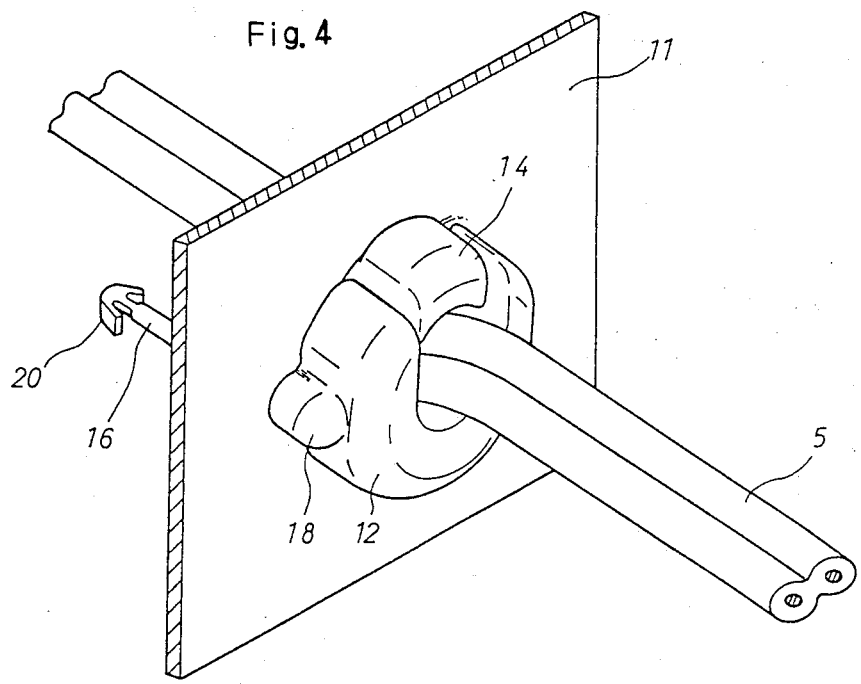
FIG. 4 is a perspective view of the cord bushing in FIG. 3 fitted into the apertures.
Figure 5:
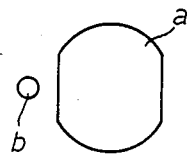
FIG. 5 is a plan view illustrating the contours of the apertures.
Figure 6:
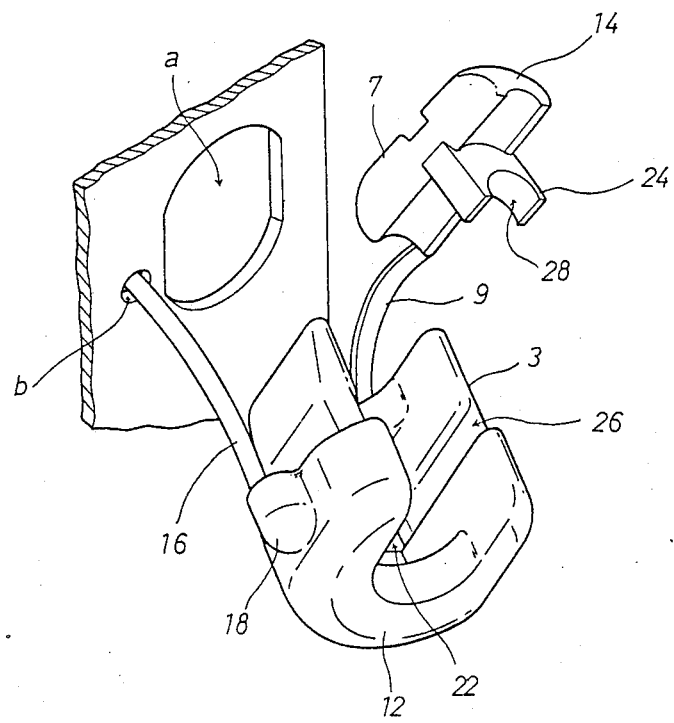

Now, a first embodiment of the present invention will be explained in detail in referece to FIGS. 1 to 6, in which FIG. 1 is a perspective view of a cord bushing and a part of an outer panel having apertures according to the embodiment; FIG. 2 is a perspective view of the cord bushing; FIG. 3 is a perspective view of the cord bushing when a cord is laid thereinto; FIG. 4 is a perspective view of the cord bushing fitted into the apertures; FIG. 5 is a plan view illustrating the contours of the apertures; and FIG. 6 is a perspective view of the cord bushing from which the cord is removed for maintenance or the like.

As shown in FIG. 1, a cord bushing 1 of the embodiment includes a body portion 3 having a U-shaped groove and a lid portion 7 cooperating with the U-shaped groove to define a passage for holding a cord 5 laid in the groove, which are integrally interconnected by a flexible hinge 9. The body portion 3 and the lid portion 7 assembled in the state shown in FIG. 1 are fitted into a first aperture a in an outer panel 11. The body portion 3 and the lid portion 7 are provided with flanges 12 and 14, respectively, and the flange 12 of the body portion 3 is provided at a portion thereof with an additional flange 18 from which a falling-off preventing bar 16 extends, as shown in the drawing. The falling-off preventing bar 16 has at the extreme end thereof a resilient arrowhead-like check member 20. When the check member 20 is inserted into a second aperture b formed in the outer panel 11, it is deflected due to the resilience to easily pass through the aperture b. Once passed through the second aperture b, the check member 20 is restored to its open state due to its resilience, trapped in the aperture b and thereby prevents falling off of the cord bushing 1.

Now the description will be related to retaining of the cord 5 in conjunction with FIGS. 2, 3 and 4. The U-shaped groove has at the base 22 thereof a stepped portion or guide groove 26 corresponding to a cord retainer 24 projectingly provided at the inside of the lid portion 7. When the cord 5 is laid into the U-shaped groove of the body portion 3, the cord retainer 24 is fitted into the guide groove 26 and the lid portion 7 is pressed down, a concaved extreme end portion 28 of the cord retainer 24 is deflected to press the cord 5 against the base 22 of the U-shaped groove.

When the cord bushing 1 in this state is fitted into the first aperture a, locking means constituted by the groove 30 formed on the upper surface of the lid portion 7 and a similar groove (not shown) formed on the lower surface of the body portion 3 are brought into abutment, partly due to the resilience of the cord 5, against the outer panel 11 at the edge of the first aperture a to lock the cord bushing 1 in the panel.

FIG. 4 shows the cord bushing 1 in this locked position. As the cord bushing 1 has parallel portions on both sides of the surface coming in abutment against the first aperture a, once fitted into the aperture, with the aid of existence of the falling-off preventing bar 16, the rotation of the cord bushing 1 relative to the outer panel 11 is effectively prevented. The configuration of the first aperture a is shown in FIG. 5.

FIG. 6 shows that the cord 5 is removed from the cord bushing 1 for maintenance or the like. When the lid portion 7 is depressed to push the cord bushing 1 totally out of the outer panel 11, locking by the groove 30 and other portions of the bushing is released to detach the cord bushing 1 from the aperture a, and the lid portion 7 is drawn out of the body portion 3 to permit the removal of the cord 5. As the falling-off preventing bar 16 has at the extreme end thereof the check member 20 trapped in the second aperture b to avoid extraction of the bar 16, the cord bushing 1 is suspended from the outer panel 11 by the falling-off preventing bar 16 and kept from falling off.

The cord bushing 1 of this embodiment thus constructed retains, with no fear of spoiling, the function of the background art permitting positive anchoring of the cord 5 to the outer panel 11 of the electrical apparatus and free removal therefrom at any time desired for maintenance or the like, and also has the advantage that, as it is suspended from the outer panel 11 by the falling-off preventing bar 16 when removed from the outer panel 11, there is no risk of falling off. As the falling-off preventing bar 16 does not restrict movement of the cord bushing 1 in the direction perpendicular to the outer panel 11 until the check member 20 comes in abutment against the outer panel 11, there is no fear of hindering removal of the cord bushing 1 from the outer panel 11. Also in this embodiment, since the falling-off preventing bar 16 is not seen after the cord bushing 1 is attached, its finished appearance is beautiful, as shown in FIG. 4. Furthermore, there remains no fear of rotation of the cord bushing 1 relative to the outer panel 11.

Figure 7A:
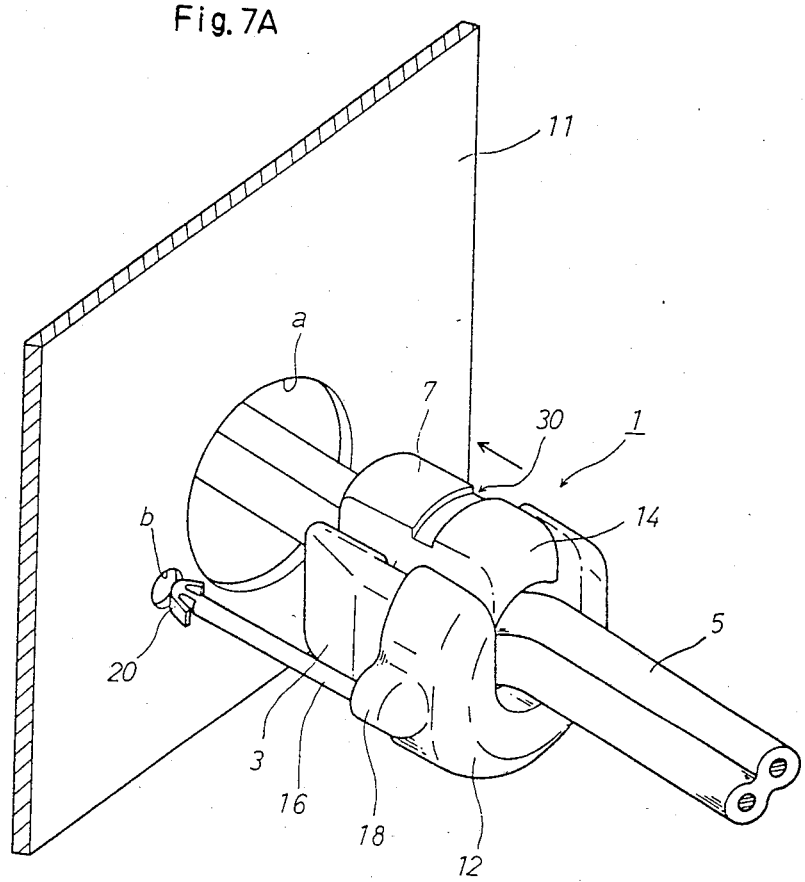
FIG. 7A is a perspective view of the cord bushing and a part of the outer panel according to another embodiment of the present invention.
Figure 7B:
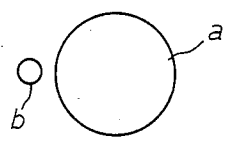
FIG. 7B is a plan view of the apertures in FIG. 7A.
Figure 8:
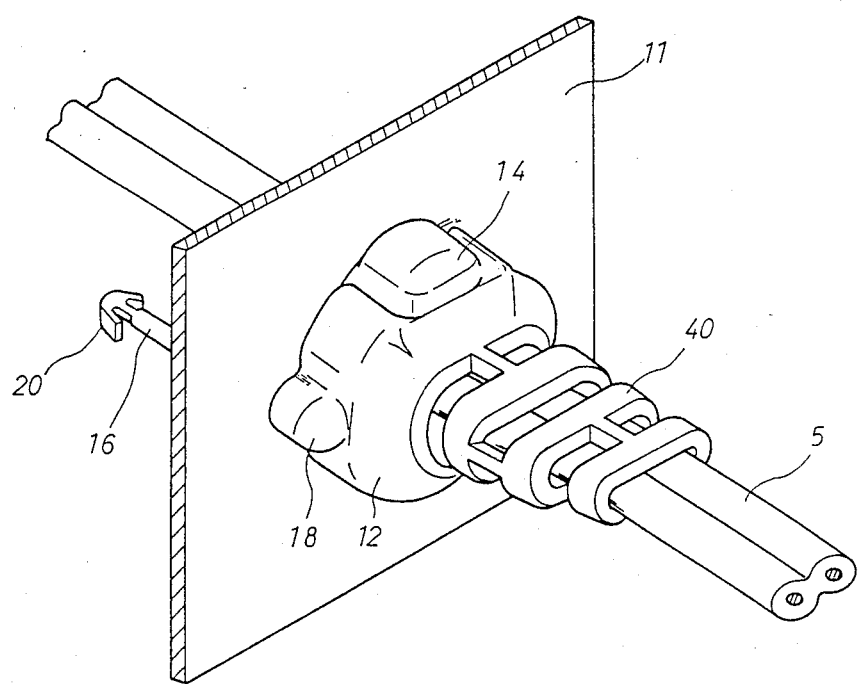
FIGS. 8 and 9 are perspective views of cord bushings according to further embodiments of the present invention.
Figure 9:
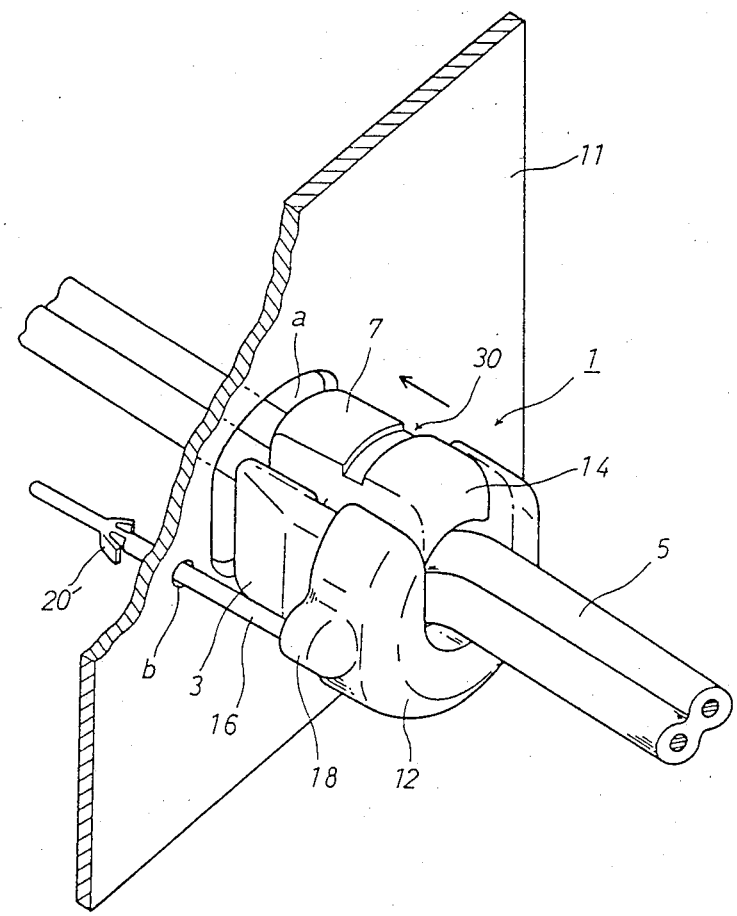

Although the invention has been described with respect to a preferred embodiment thereof, the same is in no way limited to the embodiment and various modifications may be made. For example, the body portion may be of circular cross section and the corresponding aperture a may be formed circular to facilitate machining of the outer panel 11. Such other embodiments are shown in FIGS. 7A to 9. FIG. 7A is a perspective view of another embodiment in which the aperture a is formed circular. FIG. 7B is a plan view of the circular aperture. FIG. 8 is a perspective view of a further embodiment additionally comprising a cord protector 40 composed of rings arranged outwardly of the electrical apparatus and adapted for preventing flex of the cord. FIG. 9 is a perspective view of a further embodiment in which a modified check member 20' is employed.

As described above, the cord bushing of the present invention permits positive anchoring of a cord or the like to an outer panel or the like of an electrical apparatus and free removal therefrom at any time desired for maintenance or the like, and also has the advantage that, when removed, it is suspended from the outer panel by the falling-off preventing bar, thereby being free from the fear of falling off or being mislaid. Furthermore, as the falling-off preventing bar causes no restriction to movement of the cord bushing in the direction perpendicular to the outer panel, no facility for changing operation of cords is spoiled.

Since the falling-off preventing bar serves as means for preventing rotation of the cord bushing, specific means for preventing rotation of the cord bushing can be omitted by giving proper shapes to the body portion and the aperture receiving the body portion, or the aperture may be of such a configuration as to be machined easily.

What is claimed is:

1. A cord bushing comprising:

means including a body portion for defining a passage for holding therein a cord and being fittable into a first aperture in an outer panel of an electrical apparatus;

flanges provided at one end of said means for defining a passage and having outer diameters greater than said first aperture, one of said flanges forming a part of said body portion;

said means for defining a passage including locking means for locking said means for defining a passage in said outer panel adjacent said flanges; and a falling-off preventing bar in the form of a rod extending from said one of said flanges substantially in the same direction as said passage and fittable in a second aperture when the body portion is fitted into said first aperture, said falling-off preventing bar including extraction preventing means in the form of a check member for preventing the falling-off preventing bar from being extracted after passing through said second aperture.

2. The cord bushing as defined in claim 1, wherein the cross-sectional size of said check member is greater than that of said second aperture into which it is fittable.

3. The cord bushing as defined in claim 1, wherein said check member is formed of resilient material.

4. The cord bushing as defined in claim 1 wherein said falling-off preventing bar is longer than the body portion.

5. The cord bushing as defined in claim 1, wherein said means for defining a passage includes a lid portion, and wherein a flexible hinge interconnects the body portion and said lid portion.

6. The cord bushing as defined in claim 5, wherein said passage is defined in part by a U-shaped groove in said body portion, and wherein a cord retainer projects from said lid portion and is fittable in said U-shaped groove.

7. The cord bushing as defined in claim 1, wherein said one of said flanges includes an additional flange from which said falling-off preventing bar extends.

* * * * *